Aug. 25, 1959   L. H. WARRICK ET AL   2,901,180
LAWN SPRINKLER
Filed Nov. 18, 1957                                2 Sheets-Sheet 1
FIG_1
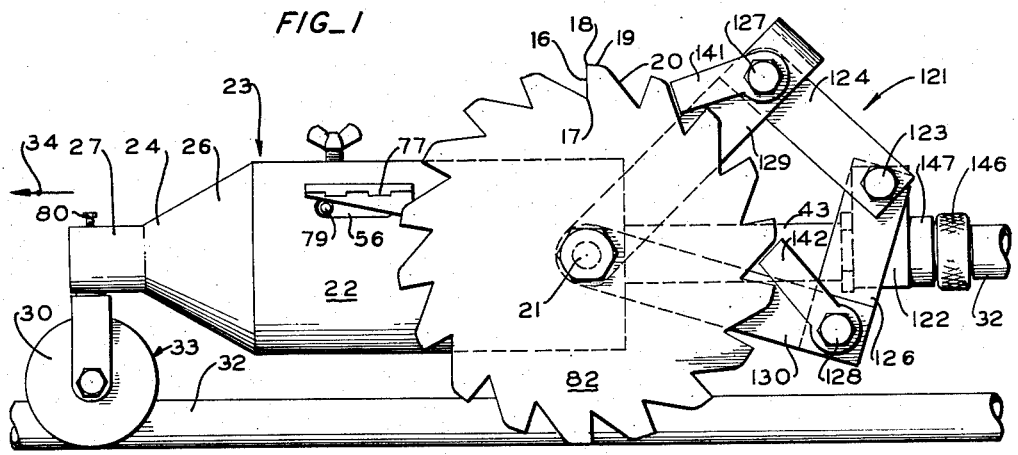
FIG_2
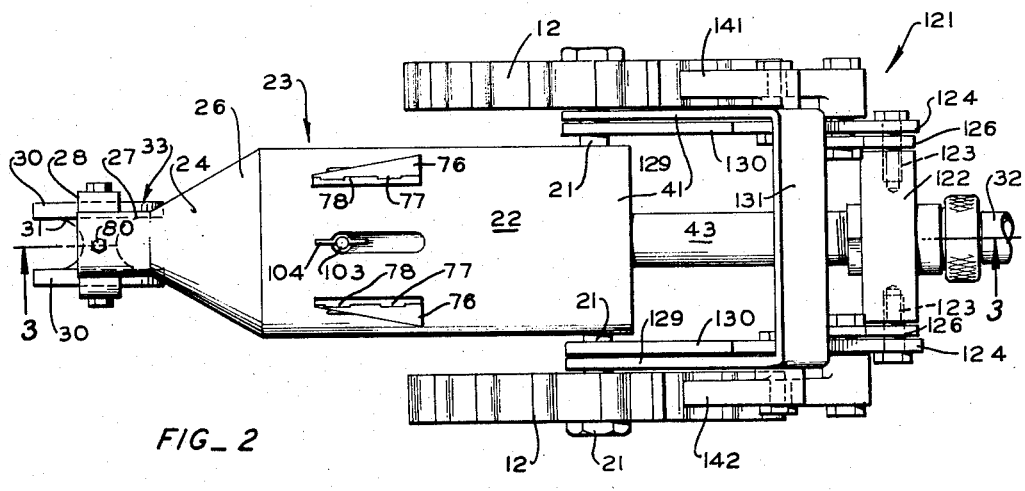
INVENTORS
LEON H. WARRICK
ALVIN L. LOY, SR.
BY Lothrop & West
ATTORNEYS Aug. 25, 1959  L. H. WARRICK ET AL  2,901,180
LAWN SPRINKLER
Filed Nov. 18, 1957  2 Sheets-Sheet 2
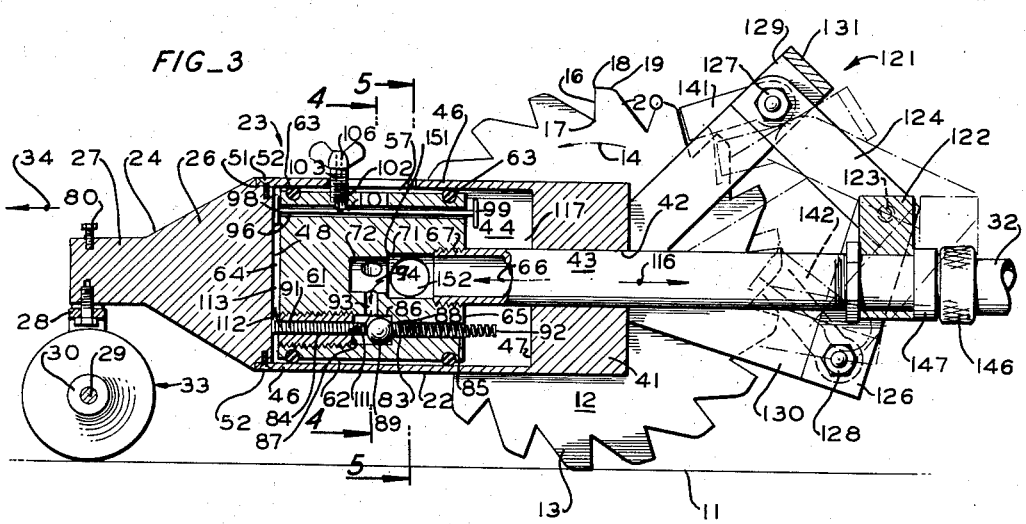
FIG_3
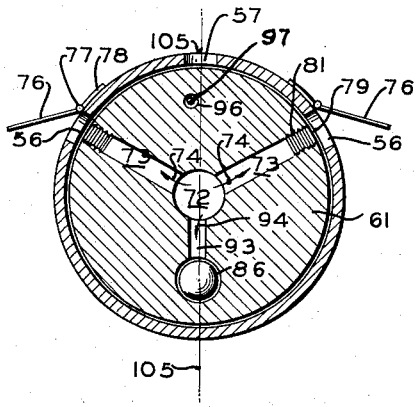
FIG_4
FIG_5
FIG.6
INVENTORS
LEON H. WARRICK
ALVIN L. LOY, SR.
BY Lothrop & West
ATTORNEYS

United States Patent Office 2,901,180
Patented Aug. 25, 1959

2,901,180

LAWN SPRINKLER

Leon H. Warrick, North Sacramento, and Alvin L. Loy, Sr., North Highlands, Calif.

Application November 18, 1957, Serial No. 697,110

7 Claims. (Cl. 239—67)

The invention relates to devices for sprinkling lawns and, more particularly, to self-propelling sprinklers, adapted to traverse a predetermined course of travel and to cease sprinkling at a predetermined location.

It is an object of the invention to provide a sprinkler which requires but a minimum of attention for long periods of time while it is in use.

It is another object of the invention to provide a sprinkler which furnishes a uniform spray pattern and which evenly distributes the water throughout the course of travel.

It is still another object of the invention to provide a sprinkler in which the course of travel is pre-set.

It is a further object of the invention to provide a sprinkler in which the water flow can be halted at any convenient desired location of the sprinkler.

It is still a further object of the invention to provide a sprinkler which has but few moving parts to get out of order and which is therefore durable and long-lived.

It is another object of the invention to provide a generally improved lawn sprinkler.

Other objects, together with the foregoing, are attained in the embodiment described in the following description and shown in the accompanying drawings in which:

Figure 1 is a side elevation;

Figure 2 is a plan;

Figure 3 is a vertical median longitudinal section, the plane of section being indicated by the line 3—3 in Figure 2;

Figure 4 is a transverse section to an enlarged scale of the cylinder and piston head and is especially illustrative of the valve mechanism, the plane of section being indicated by the line 4—4 in Figure 3; and Figure 5 is a transverse section selected particularly to show the mechanism used to halt the sprinkler's operation at a predetermined location, the plane of section being indicated by the line 5—5 of Figure 3.

Figure 6 is a fragmentary median transverse section, to an enlarged scale, of the speed control bolt-channel structure and environment.

While the lawn sprinkler of our invention is susceptible of numerous physical embodiments depending on the environment and requirements of use, substantial number of the herein shown and described embodiments have been made and used and have performed in an eminently satisfactory fashion.

Exerting a strong tractive effort against the underlying sod 11, turf or lawn, is a pair of drive wheels 12 each having on its periphery a plurality of teeth 13. Since the wheels rotate in the direction indicated by the arrow 14 the forward face 16 of each tooth is substantially radial, the front face 16 extending from a root 17 to a tip 18. Extending away from the tip 18 is a top face 19 and a sloping rear face 20.

Each of the wheels 12 is rotatably mounted on a stub shaft 21 projecting outwardly from a right circular cylinder 22 forming the after portion of the sprinkler body, generally designated by the numeral 23, the forward portion 24 of the body including a frusto-conical member 26 and a circular cylindrical member 27. Preferably, the forward body portion 24 is solid so as to act as a counterweight.

Pivotally mounted on the bottom of the forward member 27 is a bifurcated bracket 28 having mounted therein a shaft 29 having rotatably mounted thereon a pair of wheel halves 30. Each of the wheel halves is disposed in mirror symmetry with respect to the other and each is independently rotatable. The wheel halves are so conformed as to provide, jointly, a semi-circular groove 31 adapted to encompass partially a water-hose 32 disposed on the lawn and laid out in a predetermined path. As the sprinkler advances, the hose guides the two wheel halves, collectively termed a guide wheel 33 along the direction of the hose. The independently rotatable wheel halves and the freely rotatably bracket 28 serve most effectively to direct the sprinkler along the pre-set path of the hose in the forward direction indicated by the arrow 34.

Whereas the after end 41 of the cylinder 22 is preferably solid except for a bore 42 providing a bearing surface for a water conduit 43 which reciprocates in a fore and aft direction during operation of the sprinkler, the forward portion of the cylinder 22 is counterbored so as to provide a chamber 44 bounded by cylindrical walls 46, an after wall 47 and a forward wall 48. As can be seen most clearly in Figure 3, the chamber's forward wall 48 is formed by the rear wall of the body portion 26, the body portion 26 being provided with a short counterbore 51 enabling the portion 26 to be fastened to the forward end of the chamber walls 46 as by fastenings 52.

The chamber walls are pierced by a pair of elongated openings 56, or ports, or slots, on the opposite upper side portions of the cylinder, as appears most clearly in Figure 4. A single elongated slot 57 is also furnished at the uppermost portion of the cylinder.

Slidably disposed in the chamber 44 is a piston head 61 provided on its walls 62 with a pair of O-rings 63 serving to maintain pressure on first the forward face 64 and next on the after face 65 of the piston head as reciprocation occurs.

Throughout the reciprocation cycle, water is discharged through the discharge ports 56 in a substantially constant volume. Water passing through the conduit 43 in the direction indicated by the arrow 66 emerges from the conduit at the forward end of the threaded portion 67 of the conduit, which is in threaded engagement with a drilled and tapped opening in the rear face of the piston head. The water thereupon traverses thence into a second chamber 72 illustrated in Figures 3 and 4.

Upon reaching the inner chamber 72, the water divides, a portion flowing upwardly through a pair of channels 73 and outwardly through the corresponding pair of elongated ports 56 in the cylinder walls, the flow direction being indicated by the arrows 74. The slots 56 are made long enough so that regardless of the position of the piston head, discharge from the channels can take place.

It is ordinarily desired that the two water streams be broken up. Accordingly, a pair of deflector plates 76, or wings, preferably triangular in shape, as appears in Figures 1 and 2, is provided. The plates 76 are mounted, as by tight hinges 77 to a mounting plate 78 appropriately secured to the sprinkler body 22. By moving the wings upwardly or downwardly any desired degree of water spray and distance can be obtained.

In the event it is desired to block flow from one of the channel 73 openings, as for example the opening 79, as appears most clearly in Figures 1 and 4, a small spare machine bolt 80 carried on the forward end 27 of the body, as shown in Figures 1, 2, and 3, in a suitable threaded aperture, is unscrewed from the aperture and is screwed into the threaded portion 81 adjacent the channel opening 79.

While the large majority of the water passes immediately outwardly through the channels 73, a fraction of the water is diverted from the inner chamber 72 to effect reciprocation of the piston head in a fashion now to be described.

Below the chamber 72 and extending longitudinally through the piston head is a first throughbore 83 comprising a forward portion 84 and an after portion 85. The throughbore portions 84 and 85 are separated by a ball chamber 86 somewhat larger in diameter than the portions 84 and 85 and thus forming at the intersections therewith a pair of valve seats, namely, a forward valve seat 87 and an after valve seat 88 adapted to engage alternately a ball 89 placed within the chamber 86.

Loosely disposed within the forward bore 84 and the after bore 85 is a forward helical spring 91 and an after helical spring 92, respectively. Connecting the chamber 72 and the ball chamber 86 is a cross-port 93, water flowing into the cross-port 93 as indicated by the arrow 94.

Located vertically above the chamber 72 and extending longitudinally through the piston head is a second throughbore 96 having loosely disposed therein a stem 97 having mounted on the opposite ends thereof a forward head 98 and an after head 99. A side port 101 is in communication with a larger counterbored and tapped opening 102 having located therein a threaded machine bolt 103 with a wing nut 104 mounted thereon, the bolt 103 projecting upwardly through the slot 57.

Preferably the second throughbore 96 is located slightly to one side of the vertical median plane 105 extending through the slot 57 and the vertical axis of the machine bolt 103. Also, the machine bolt has bored therethrough a substantially vertical channel 106, as appears in Figures 3 and 6. The channel 106 is inclined sufficiently, however, so that the aperture at the bottom of the bolt channel 106 is off-set from the vertical axis of the bolt. Consequently, as the bolt 103 is rotated, the off-set bolt aperture is in communication with the off-set bore 96 through a portion of the rotation and through another portion of rotation is isolated from the bore 96. As a result of this structure water can be allowed to flow through the channel 106 into the atmosphere, it can be prevented from doing so, or it can be allowed to flow in a reduced amount. When the water is prevented from flowing through the channel 106, back-pressure is built up inside the cylinder, as will be explained, and the sprinkler is halted. Such a condition may be desired when the user wishes to have the sprinkler continue to operate in a fixed location. By adjusting the amount of the opening any desired speed below maximum can be obtained, the valve serving as a nice speed regulator.

Having described the valve structure the reciprocating operation of the piston head will now be described.

Assuming that the elements are in the locations shown in Figure 3, and assuming further that water, under pressure, is flowing downwardly through the cross-port 93, it can be seen that the water will flow into the interior of the compressed forward helical spring 91 as indicated by the arrows 111 and 112, emerging into the forward space 113 whose thickness is determined by the thickness of the forward valve head 98. Water is at this time prevented from flowing to the rear face of the piston by reason of the ball 89 being seated on the seat 88. Pressure on the forward face of the piston head urges the piston and the attendant water conduit toward the right, in the right-hand direction 116 as appears in Figure 3. Concurrently, the after valve head 99 being in open position, water flows into the bore 96 and outwardly through the bolt channel 106, thus relieving the pressure on the rear face of the piston.

As the piston proceeds toward the right-hand direction 116 as shown in Figure 3, the forward space 113 grows larger and the after space 117 smaller. As soon as the free end of the after helical spring 92 abuts the rear cylinder wall 47, the spring 92 begins to compress. Upon being substantially fully compressed, the spring 92 acts somewhat like a solid rod and urges the ball 89 away from the valve seat 88 and into engagement with the valve seat 87, the forward spring 91 having, in the meantime, returned to fully extended condition. Substantially simultaneously with the unseating of the ball 89 from the seat 88 the after valve head 99 is closed owing to its abutment with the after cylinder wall 47.

At this juncture, the water travelling downwardly through the cross-port 93 will flow rearwardly through the valve 88 and into the rear space 117, causing the piston to move forwardly into the location shown in Figure 3. This cycle repeats so long as water flows into the cross-port 93 and so long as the shut-off or back pressure valve, comprising the bored bolt 103 mechanism, is in open position.

The reciprocating motion of the piston is translated into forward motion of the sprinkler by a double-acting pawl and ratchet type of mechanism, generally designated by the numeral 121.

Each of the wheels 12 is rotated by similar coacting elements. Thus, a description of the mechanism on one side will serve equally to describe the mechanism on the other side.

A cross-bar 122 mounted on the after end of the water conduit 43 has pivotally mounted thereon, about a pin 123, an upper lever 124 and a lower lever 126. Pivotally mounted on the distal ends, in turn, of the levers 124 and 126, about pins 127 and 128, respectively, is an upper link 129 and a lower link 130. The forward ends of both the upper link 129 and the lower link 130 are pivotally mounted on the adjacent stub shaft 21 on which the wheel 12 is mounted. A cross-bar 131 connecting the upper ends of the pair of links 129 ties the structure together and assists in producing a unitary action between both wheels.

Figures 1, 2 and 3 illustrate, in full line, the positions of the wheel rotating elements in forward-most location of the piston. In this forward position an upper pawl 141 pivotally mounted on the pin 127 is in abutment with the back face 20 of the adjacent wheel tooth and is inclined at a slight forward and downward angle. Concurrently, a lower pawl 142 is in contact with the back face of a tooth and assumes a rather steep forward and upward inclination.

As the piston moves toward the rear, the cross-pin 123 separates longitudinally from the stub-shaft 21 secured to the sprinkler body. As a consequence, the levers 124 and 126 and the links 129 and 130 tend to draw out in lazy-tong fashion, the pins 127 and 128, on which the pawls are pivoted, are urged toward each other and toward the water conduit 43 or piston rod. Thus, as can be seen by reference to Figure 3 (where the elements in extreme right-hand position are shown in outline) two occurrences take place as a result of this movement of the parts. First, the link 130, the pin 128 and the pawl 142 urges the tooth with which it is in engagement in a counterclockwise direction, causing the sprinkler to advance by a corresponding amount. Second, as the link 129, the pin 127 and the pawl 142 are swung downwardly, about the shaft 21 as a center, the pawl 141 clicks downwardly and into engagement with the back face of the following tooth.

Then, as the piston moves forwardly, the opposed links and levers are forced to separate. As this motion occurs the pin 127 is urged upwardly and forwardly, pushing ahead of it the upper pawl 141 which, in turn, urges the abutting tooth in a counter-clockwise direction. Concurrently, the lower lever 126 causes the pin 128 to move forwardly and downwardly so that the lower pawl 142 clicks down and into engagement with the next tooth.

As a result of these movements, the wheel 12 and thus the sprinkler itself is advanced as each piston stroke takes place.

In starting the sprinkler to operate, a coupling 146 on the end of the hose 32 distant from the water source (not shown) is attached to a matching coupling 147 on the rear end of the conduit. Preferably, about a foot or two of hose is recurved so that the hose portion immediately adjacent the coupling 146 extends rearwardly and in approximate alignment with the axis of the piston rod 43. Side thrust on the rod as it moves rearwardly is thereby obviated.

It is frequently desirable to be able to stop the sprinkler at a pre-set location without the user's having to be present. As can be seen most clearly in Figures 3 and 5, mechanism is provided to achieve this result. The chamber 71 formed within the piston head is somewhat larger in diameter than the adjoining inner chamber 72. Consequently, at the intersection of the two chambers a circular valve seat 151 is provided. The valve seat 151 is adapted to receive, in substantially water tight relation, a ball 152, the ball being "normally" located in an adjoining compartment 153 intersecting the chamber 71.

Ordinarily, the sprinkler moves along the surface in a substantially upright position and in this attitude the ball 152 remains at the outer end of the compartment 153 since the axis of the compartment is inclined in an outward and downward direction, as appears most clearly in Figure 5. By inclining the sprinkler, however, to the attitude shown in outline in Figure 5, gravity causes the ball to roll out of the compartment 153 and into the compartment 71 so as to assume the position shown in Figure 3 where water, emerging from the conduit 43, urges the ball 152 into engagement with the valve seat 151 and halts further water flow.

In order to effect this result a wedge-shaped member 161 is placed by the user at the location where shut-off is desired. Then, as the sprinkler reaches the pre-set location, and the wheel on the side toward which the ball 152 is "normally" located crawls up the wedge until the ball is rolled into seated position, the entire device ceases operations.

To reactivate the sprinkler it is only necessary to relieve the pressure behind the ball momentarily as by closing the water supply valve, or partially unscrewing the coupling 146, and tilting the machine so as to return the ball to its compartment.

It can therefore be seen that we have not only provided a highly flexible lawn sprinkler, and one which gives an even and well-distributed spray (the water emerging from the back-pressure valve 103 serving to water the lawn in the area immediately adjacent the sprinkler), but we have also furnished a sprinkler which can be caused to cease operations at any predetermined location.

What is claimed is:

1. A lawn sprinkler comprising an elongated hollow cylinder, a pair of drive wheels rotatably mounted on one end of said cylinder, a guide wheel rotatably mounted on the other end of said cylinder, a piston reciprocably mounted within said cylinder, said piston having a coaxial chamber formed therein extending from a central location within said piston to the after end thereof, a water conduit slidably mounted in an opening adjacent the after end of said cylinder and connected to said coaxial chamber in said piston whereby water is supplied to said chamber, said piston further having formed therein a pair of channels extending radially outwardly and upwardly from said chamber and opening at the periphery of said piston in registry with a corresponding pair of elongated slots in the upper walls of said cylinder whereby water entering said chamber from said conduit flows outwardly through said channels and externally through said slots, and means on said water conduit for engaging and advancing said drive wheels as said water conduit reciprocates with said piston.

2. The device of claim 1 wherein said piston is further characterized by an upper longitudinal throughbore extending the length of said piston, a stem longer than said piston loosely and slidably disposed in said upper throughbore, said stem having mounted on the opposite ends thereof a forward head and an after head, said piston also having a vertical opening extending from said upper throughbore to the upper margin of said piston and being in registry with an elongated slot at the top of said hollow cylinder, said stem being alternately urged between a first position wherein one end of said upper throughbore is covered by the adjacent one of said heads to a second position wherein the other end of said upper throughbore is covered by the adjacent one of said heads as the reciprocation of said piston alternately urges said heads against the adjacent end walls of said cylinder, there being an annular space between said stem and the confining walls of said upper throughbore whereby water can flow from the uncovered end of said upper throughbore through said annular space and outwardly through said vertical opening in said piston and said elongated slot in said cylinder.

3. The device of claim 2 further characterized by means for controlling the quantity of flow of water from said upper throughbore through said vertical opening, said means including offsetting the longitudinal axis of said upper throughbore from the vertical axis of said vertical opening whereby the connecting port formed by their intersection is displaced toward one side of said upper throughbore, and a threaded bolt disposed in said vertical opening, said bolt having formed therein an inclined channel extending from the upper end thereof to the lower end thereof at a location removed from the bottom of said bolt whereby said channel is in communication with said upper throughbore in one angular position of said bolt and is blocked by the wall of said opening in another angular position of said bolt.

4. The device of claim 1 wherein said piston also has formed therein a lower throughbore extending longitudinally through said piston and a ball chamber interposed in and larger than said lower throughbore to form a pair of ball valve seats at the junctions of said ball chamber and the opposite portions of said lower throughbore, said piston also having a cross-port connecting said coaxial chamber and said ball chamber, a ball movably disposed in said ball chamber, and a pair of springs disposed in the opposite portions of said lower throughbore, said springs extending in open position from the adjacent of said ball valve seats to a location beyond the adjacent end of said piston whereby said ball is urged alternately from one seat to the other by the compression of alternate ones of said springs against the adjacent one of the end walls of said cylinder.

5. The device of claim 1 further characterized by means for blocking the flow of water from said conduit to said coaxial chamber as said cylinder is inclined about an axis.

6. A lawn sprinkler comprising a hollow cylinder including an interior cylindrical chamber defined by the circular cylinder walls, a forward wall and an after wall, a piston slidable within said cylindrical chamber, said piston having a coaxial chamber opening toward the after end of said piston, a water conduit mounted on said piston and connecting with the opening of said coaxial chamber, said conduit being slidably disposed in the after wall of said cylinder, a pair of ground-engaging wheels rotatably mounted on said cylinder, and means connecting said water conduit and said cylinder for driving said wheels in a forward direction.

7. The device of claim 6 wherein said cylinder walls have formed therein an elongated longitudinal slot, and wherein said piston has formed therein a channel connecting with said coaxial chamber and being in registry with said slot whereby water entering said coaxial chamber from said water conduit is directly exteriorly through said channel and said slot at all axial locations of said piston.

References Cited in the file of this patent

UNITED STATES PATENTS

| | | |
|---|---|---|
| 2,575,828 | Muench | Nov. 20, 1951 |
| 2,707,655 | Steen | May 3, 1955 |